(12) United States Patent
Wang et al.

(10) Patent No.: US 8,141,882 B2
(45) Date of Patent: Mar. 27, 2012

(54) WHEEL SEAL

(75) Inventors: Shang-Huang Wang, Nantou County (TW); Mark Bannister, Nantou County (TW)

(73) Assignee: Cho Sealing Technology Ltd, Nantou County (TW)

( * ) Notice: Subject to any disclaimer, the term of this patent is extended or adjusted under 35 U.S.C. 154(b) by 315 days.

(21) Appl. No.: 12/413,742

(22) Filed: Mar. 30, 2009

(65) Prior Publication Data
US 2010/0219587 A1 Sep. 2, 2010

(30) Foreign Application Priority Data
Feb. 27, 2009 (TW) .............................. 98202975 U

(51) Int. Cl.
*F16J 15/32* (2006.01)
*F16J 15/34* (2006.01)

(52) U.S. Cl. .................................. 277/551; 277/353
(58) Field of Classification Search .................. 277/349, 277/351, 562
See application file for complete search history.

(56) References Cited

U.S. PATENT DOCUMENTS

| | | | | |
|---|---|---|---|---|
| 3,021,161 A * | 2/1962 | Rhoads et al. | ................ | 277/568 |
| 4,185,838 A * | 1/1980 | Danner | ......................... | 277/562 |
| 4,807,890 A * | 2/1989 | Gorman et al. | ............... | 277/346 |
| 5,183,269 A * | 2/1993 | Black et al. | .................... | 277/349 |
| 5,201,529 A * | 4/1993 | Heinzen | ........................ | 277/351 |
| 5,611,548 A * | 3/1997 | Dahlhaus | ....................... | 277/574 |
| 5,895,052 A * | 4/1999 | Drucktenhengst et al. | ... | 277/351 |
| 2011/0044569 A1 * | 2/2011 | Haepp et al. | ................. | 384/480 |

* cited by examiner

Primary Examiner — Thomas Beach
Assistant Examiner — Nicholas L Foster
(74) Attorney, Agent, or Firm — Ming Chow; Sinorica, LLC

(57) ABSTRACT

A wheel seal is mainly provided with an annular internal sleeve oil seal. An annular concave inwards is formed at one side of the internal sleeve oil seal to contain one end of an annular outer annular member. A gap is kept between the internal sleeve oil seal and the outer annular member to contain an anti-friction ring and a second barrier. A labyrinth zone that is up and down is formed in the second barrier. Thus, the anti-friction ring is used to not only block foreign matters from entering the wheel seal through the gap and then being damaged, but also effectively transfer the strength from the inner annular member to the outer annular member at the time of installation for increasing the success rate of installation.

6 Claims, 4 Drawing Sheets

WHEEL SEAL

BACKGROUND OF THE INVENTION

1. Field of the Invention

This invention relates to a wheel seal.

2. Description of the Related Art

With reference to FIGS. 1 and 2, partially enlarged sectional views of a bearing located in a conventional wheel hub, and of a conventional seal, the wheel hub 100 is mainly provided with an hub bore 101 through which an shaft 200. Further, a tapered roller bearing 300 is set on the shaft 200 and contained in the hub bore 101. Then, lubricant is filled into the hub bore 101 to lubricate and protect the shaft 200 and the tapered roller bearing 300, and opposite to the tapered roller bearing 300, a seal 400 is provided at the other end of the hub bore 101 to prevent the lubricant from leaking The seal 400 is an inner annular member 401. At a side of the inner annular member 401, a container space concave inwards is formed to contain one end of an annular external sleeve oil sleeve 402. A gap is kept between the inner annular member 401 and the external sleeve oil 402, and a flexible seal member 403 is provided. Two ends of the barrier 403 separately tight fit to the inner annular member 401 and the external sleeve oil sleeve 402. Thus, the outer annular member 402 of seal 400 is made to run with the wheel hub 100, which thereby prevents the seal 400 from being worn out, due to friction, and then oil from leaking However, the gap is kept between the inner annular member 401 and outer annular member 402 of the seal 400, so foreign matters are made to easily fall into the seal 400 through the gap, which makes the barrier 403 wear down and then the lubricant leak, and even the foreign matters are made to fall into the hub bore 101, which seriously damages the shaft 200 and the tapered roller bearing 300. Further, the seal tightly fits to the hub bore, so a tool must be used to knock on the inner annular member at the time of installation for installation of the seal on the hub bore. However, due to the clearance impact, the strength is hard to transfer from the inner annular member to the outer annular member, and thus higher hammer strength is required, which easily damages the seal; it is apparent that improvement is necessarily made.

Consequently, because of the technical defects of described above, the applicant keeps on carving unflaggingly through wholehearted experience and research to develop the present invention, which can effectively improve the defects described above.

SUMMARY OF THE INVENTION

A wheel seal according to this invention comprises an internal sleeve oil seal, an outer annular member, a intermediate annular member, an anti-friction ring, a first barrier, and a second barrier. An annular concave inwards is formed at one side of the internal sleeve oil seal, and an external ring side and an internal ring side are thereby formed. The outer annular member is provided with a outer annular ring portion. One side of the outer annular ring portion brings to an end toward its central axis to form a junction side and connects to an inner annular ring portion at a free end of the junction side. The inner annular ring portion lies between the external ring side and internal ring side of the internal sleeve oil seal. Further, a gap is kept between the circumference of inner annular ring portion and the external ring side of internal sleeve oil sleeve to contain the anti-friction ring. The anti-friction ring is made from PU or nylon as an abrasion-proof material of which the coefficient of friction is low. Next, the first barrier is provided between the internal sleeve oil seal and the outer annular member. One end of the first barrier is connected to the outer annular member, while the other end is bound with a spring to fit to the internal ring side of internal sleeve oil seal. Still, the second barrier is also provided between the internal sleeve oil seal and the outer annular member. The second barrier comprises a convex portion and a concave portion that respectively stays close to the inner wall of external ring side of the internal sleeve oil seal and to the annular side of inner annular ring portion of the outer annular member. A form that rises and falls is caused at the convex portion opposite to the side of concave portion. A form that rises and falls is also caused at the concave portion opposite to and receiving the side of convex portion, and the concave portion is kept away from the convex portion at a distance of clearance, a labyrinth zone that is up and down being thereby formed. Thus, it may prevent the foreign matters from directly falling into the wheel seal and then being damaged. Further, if foreign matters of which the diameter is extremely small fall in the inner side of wheel seal, the zone rising and falling that is formed by the second barrier may still be used to hamper the foreign matters from passing and to lengthen a path where it enters, which makes the foreign matters remain at a turn point where the zone rises and falls. Accordingly, the wheel seal is featured with perfect reliability. Further, with the anti-friction ring, when the wheel seal is installed, the hammer strength may effectively transfer from the inner annular member to the outer annular member for increasing the success rate of installation.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
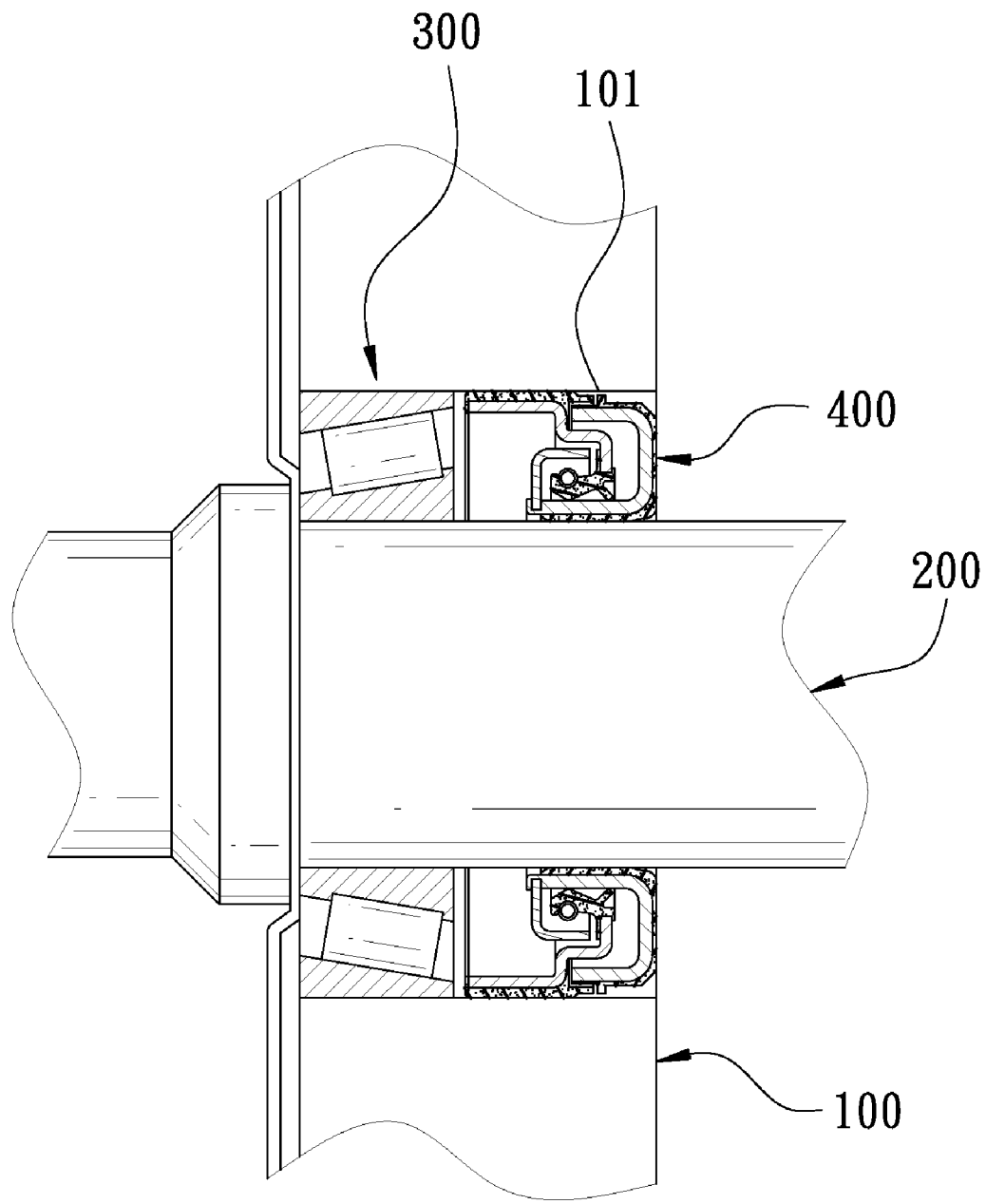
FIG. 1 is a partially enlarged sectional view of a bearing located in a conventional wheel hub.
Figure 2:
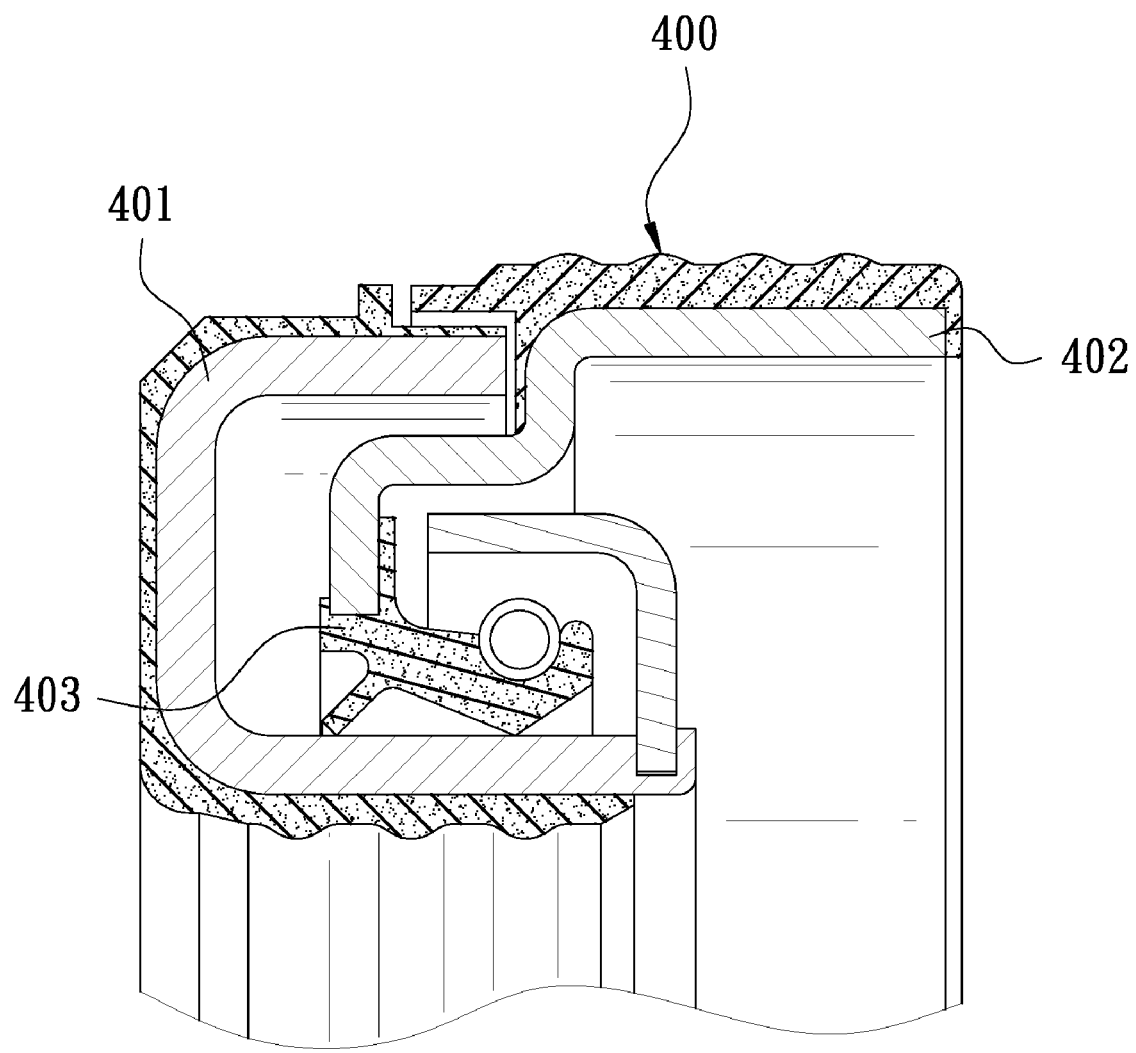
FIG. 2 is a partially enlarged sectional view of a conventional seal.
Figure 3:
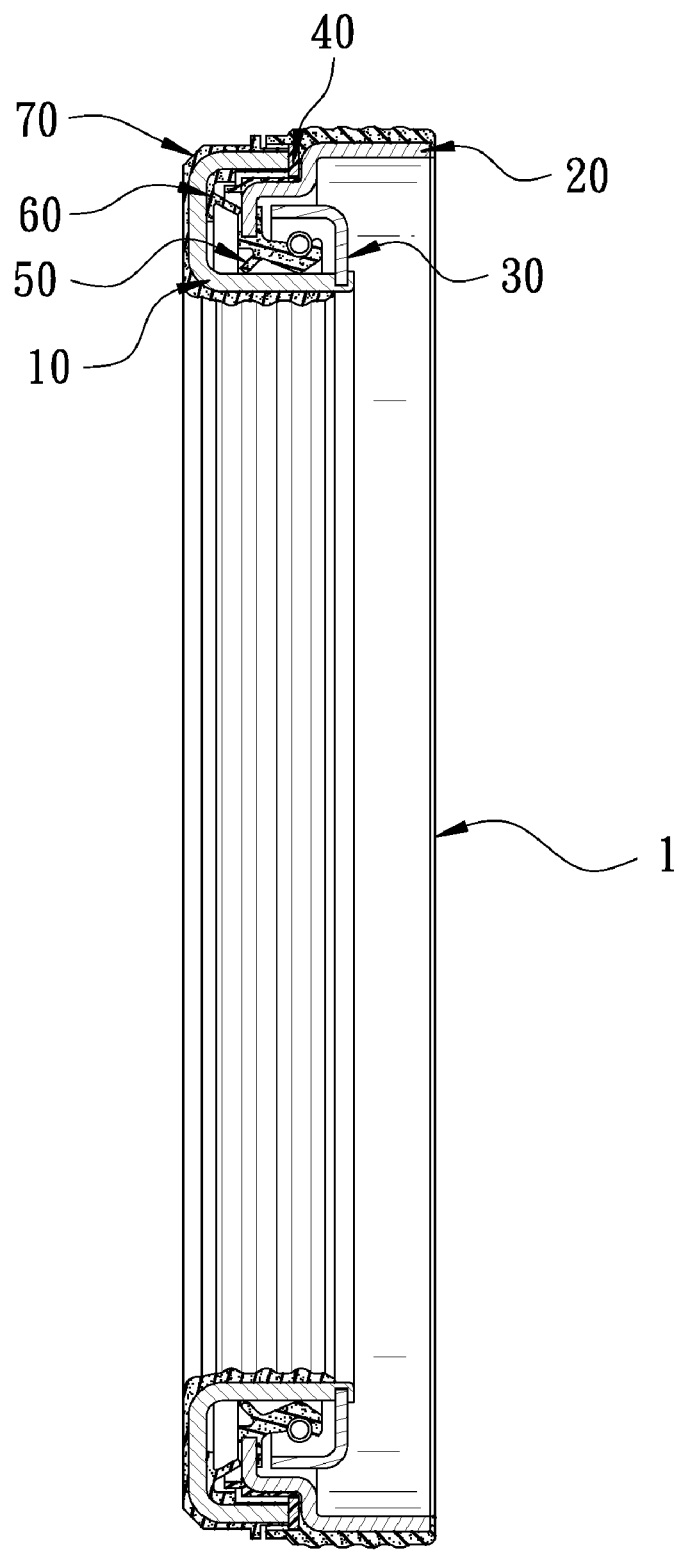
FIG. 3 is a sectional view of a wheel seal according to this invention.
Figure 4:
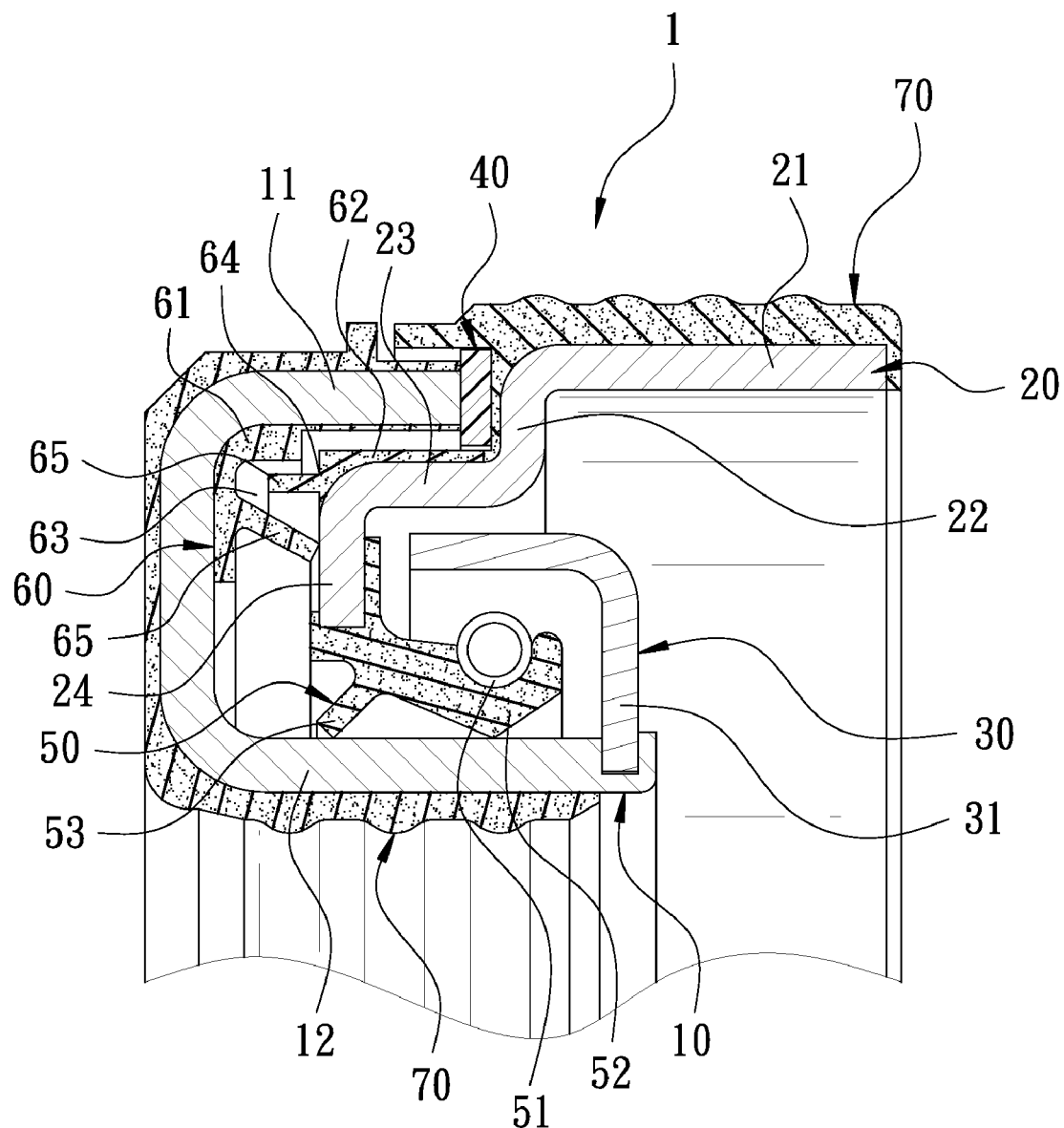
FIG. 4 is a partially enlarged sectional view of the wheel seal according to this invention.

With reference to FIGS. 3 and 4, a sectional view and a partially enlarged sectional view that illustrate a wheel seal according to this invention in a preferred embodiment, the wheel seal 1 comprises an internal sleeve oil seal 10, an outer annular member 20, an intermediate annular member 30, an anti-friction ring 40, a first barrier 50, and a second barrier 60. An annular groove concave inwards is formed at one side of the internal sleeve oil seal 10, and a U-shaped body is thereby formed, in which an external ring side 11 and an internal ring side 12 is further formed. The outer annular member 20 is provided with an outer annular ring portion 21. One side of the outer annular ring portion 21 brings to an end toward its central axis to form a junction side 22 and connects to an inner annular ring portion 23 at a free end of the junction side 22. The inner annular ring portion 23 lies between the external ring side 11 and internal ring side 12 of the internal sleeve oil seal 10. Further, a gap is kept between the circumference of inner annular ring portion 23 and the external ring side 11 of internal sleeve oil sleeve 10. The other side of the inner annular ring portion 23 opposite to the outer annular ring portion 21 brings to an end toward its central axis to form a prolonged side 24. The intermediate annular member 30 is provided between the internal ring side 12 of internal sleeve oil seal 10 and the outer annular member 20. One side of the intermediate annular member 30 brings to an end toward its central axis to form an extended side 31, while a free end of the extended side 31 is wedged to the internal ring side 12 of internal sleeve oil seal 10. Next, the anti-friction ring 40 is provided between the external ring side 11 of internal sleeve oil seal 10 and the junction side 22 of outer annular member 20, and is made from PU or nylon. The two sides of anti-friction ring 40 separately tight fit to the external ring side 11 of internal sleeve oil seal 10 and the junction side 22 of outer annular member 20. The first barrier 50 is provided between the internal sleeve oil seal 10 and the outer annular member 20, and is made of rubber. One end of the first barrier 50 is connected to the prolonged end 24 of outer annular member 20, while the other end is formed with an oil sealing lip 52 and a first wiper lip 53 and is bound with an elastic spring to 51 to fit to the internal ring side 12 of internal sleeve oil seal 10. The second barrier 60 is provided between the internal sleeve oil seal 10 and the outer annular member 20, and is also made of rubber. The second barrier 60 comprises a convex portion 61 and a concave portion 62 that respectively stays close to the inner wall of external ring side 11 of the internal sleeve oil seal 10 and to the annular side of inner annular ring portion 23 of the outer annular member 20. A form that rises and falls is caused at the convex portion 61 opposite to the side of concave portion 62. A form that rises and falls is also caused at the concave portion 62 opposite to and receiving the side of convex portion 61, and the concave portion 62 is kept away from the convex portion 61 at a distance of clearance, a labyrinth zone 63 that is up and down being thereby formed. Besides, two second wiper lip 65 is further formed on the second barrier 60. The external ring side of internal sleeve oil seal 10 stays close to a protective layer 70. The annular side of outer annular ring portion 21 of the external sleeve oil sleeve 20 also stays close to the protective layer 70. The protective layers 70 are made of rubber and their surfaces are in the form of waves. Again, with reference to FIG. 4, a partially enlarged sectional view of the preferred embodiment of this invention, thanks to the inner annular member 10 being a U-shaped member, at the time of installation, the wheel seal 1 may bear higher hammering strength and the anti-friction ring 40 is used to effectively transfers the strength from the inner annular member 10 to the outer annular member 20, the success rate of installation being thereby increased. Further, the anti-friction ring 40 is used to block the foreign matters from directly falling into the wheel seal 1 and then being damaged. Next, if foreign matters of which the diameter is extremely small fall in the inner side of wheel seal 1, the labyrinth zone 63 rising and falling and the second wiper lip 65 that are formed by the second barrier 60 may still be used to hamper the foreign matters from passing and to lengthen a path where it enters, which makes the foreign matters remain at a turn point 64 and the second wiper lip 65 where the zone 63 rises and falls. Thus, the wheel seal 1 is featured with perfect reliability, and the rubber-made protective layer 70 set around the wheel seal 1 is used to not only reach the effect of preferable sealing but also easily mount the annular side in the form of waves.

While the invention has been described in terms of what is presently considered to be the most practical and preferred embodiments, it is to be understood that the invention needs not be limited to the disclosed embodiment.

On the contrary, it is intended to cover various modifications and similar arrangements included within the spirit and scope of the appended claims which are to be accorded with the broadest interpretation so as to encompass all such modifications and similar structures.

What is claimed is:

1. A wheel seal comprising:
an internal sleeve oil seal;
an outer annular member;
an intermediate annular member;
an anti-friction ring;
a first barrier;
a second barrier; wherein:
an annular concave inwards is formed at one side of the internal sleeve oil seal;
an external ring side and an internal ring side thereby formed;
a protective layer is located close to the circumference of the internal sleeve oil seal;
the outer annular member has an outer annular ring portion;
one side of the outer annular ring portion is connected to a junction side, and the junction side is connected to a side of an inner annular ring portion;
the inner annular ring portion is located between the external ring side and the internal ring side of the internal sleeve oil seal;
a gap is located between the circumference of the inner annular ring portion and the external ring side;
another side of the inner annular ring portion opposite to the outer annular ring portion is connected to a prolonged side;
the outer annular side of the outer annular ring portion is located close to a protective layer;
the intermediate annular member is located between the internal ring side of the internal sleeve oil seal and the outer annular member;
one side of the intermediate annular member, towards its central axis, forms an extended side;
a free end of the extended side is connected to the internal ring side of the internal ring oil seal;
the anti-friction ring is located between the external ring side of the internal oil seal and the junction side of the inner annular ring portion;
the first barrier is located between the internal sleeve oil seal and the outer annular member;
one end of the first barrier is connected to the prolonged side of the inner annular ring portion of the outer annular member, and another end of the first barrier is bound with an elastic part to tightly fit against the internal ring side of the internal sleeve oil seal; and the second barrier is provided between the internal sleeve oil seal and the outer annular member, the second barrier comprises a convex portion and a concave portion that are respectively connected to the inner wall of the external ring side of the internal sleeve oil seal and the outer annular side of the inner annular ring portion of the outer annular member, the convex portion comprises a lip opposite to and projecting into the concave portion, the concave portion comprises a lip radially inside of the lip of the convex portion which contacts the prolonged side of the outer annular ring, and the concave portion is kept a distance away from the convex portion so that a labyrinth zone is formed there between.

2. The wheel seal according to claim 1, wherein the anti-friction ring is made from polyurethane.

3. The wheel seal according to claim 1, wherein the anti-friction ring is made from nylon.

4. The wheel seal according to claim 1, wherein the protective layer staying close to the circumference of the internal sleeve oil seal is made of rubber and its surface is in the form of waves.

5. The wheel seal according to claim 1, wherein the protective layer staying close to the annular side of the outer annular ring portion is made of rubber and its surface is in the form of waves.

6. The wheel seal according to claim 1, wherein the elastic part is a spring.

* * * * *